United States Patent
Gromfeld

(10) Patent No.: US 10,690,307 B2
(45) Date of Patent: Jun. 23, 2020

(54) OPTICAL PART COMPRISING A BLOCK WITH A DIOPTRIC INTERFACE FORMING A FOLDER FOR TWO BEAMS

(71) Applicant: VALEO VISION, Angers (FR)

(72) Inventor: Yves Gromfeld, Angers (FR)

(73) Assignee: VALEO VISION, Angers (FR)

( * ) Notice: Subject to any disclaimer, the term of this patent is extended or adjusted under 35 U.S.C. 154(b) by 0 days.

(21) Appl. No.: 16/521,624

(22) Filed: Jul. 25, 2019

(65) Prior Publication Data

US 2020/0041089 A1 Feb. 6, 2020

(30) Foreign Application Priority Data

Aug. 2, 2018 (FR) ...................... 18 57252

(51) Int. Cl.
  *F21S 41/24* (2018.01)
  *F21S 41/43* (2018.01)
  *F21S 41/32* (2018.01)

(52) U.S. Cl.
  CPC .............. *F21S 41/24* (2018.01); *F21S 41/322* (2018.01); *F21S 41/43* (2018.01)

(58) Field of Classification Search
  CPC ........... F21S 41/24; F21S 41/43; F21S 41/322
  See application file for complete search history.

(56) References Cited

U.S. PATENT DOCUMENTS

| | | | | |
|---|---|---|---|---|
| 2006/0239020 A1* | 10/2006 | Albou | ................... | F21S 41/322 362/520 |
| 2014/0003071 A1* | 1/2014 | de Lamberterie | .... | F21S 41/141 362/487 |
| 2015/0109810 A1* | 4/2015 | Wintzer | ................ | F21S 41/265 362/520 |
| 2017/0038023 A1* | 2/2017 | Gromfeld | .............. | G02B 27/30 |
| 2017/0211771 A1 | 7/2017 | Nishimura et al. | | |

FOREIGN PATENT DOCUMENTS

| | | |
|---|---|---|
| EP | 3 150 905 A1 | 4/2017 |
| FR | 3 010 772 A1 | 3/2015 |
| WO | WO 2018/094431 A1 | 5/2018 |

OTHER PUBLICATIONS

French Preliminary Search Report dated Jul. 2, 2019 in French Application 18 57252 filed on Aug. 2, 2018 (with English Translation of Categories of Cited Documents).

* cited by examiner

*Primary Examiner* — Evan P Dzierzynski
(74) *Attorney, Agent, or Firm* — Oblon, McClelland, Maier & Neustadt, L.L.P.

(57) ABSTRACT

An optical part includes a transparent or translucent block having first and second collimators that are intended to receive the beams of first and second light sources so that the beams enter into the block. The collimators are arranged in such a way that these sources may be positioned in a plane that an intermediate exit dioptric interface toward which the first collimator guides the first beam so that this first beam exits from the block through this intermediate dioptric interface. A cutoff dioptric interface forms a folder for the first beam and for the second beam, and the first collimator with the intermediate dioptric interface and the second collimator being arranged so that each beam converges on the cutoff edge of the folder.

20 Claims, 4 Drawing Sheets

OPTICAL PART COMPRISING A BLOCK WITH A DIOPTRIC INTERFACE FORMING A FOLDER FOR TWO BEAMS

The present invention relates to the field of luminous devices, in particular luminous motor-vehicle devices, that emit various light beams from the same optical module.

Light beams having different luminous functions are often produced by different optical modules. The drawback is the bulk in the vehicle and the fact that a different luminous signature is obtained depending on the beam turned on. This is for example the case when a high beam is passed to from a low beam, or vice versa.

A low beam is a beam for lighting the road having a cutoff above which almost no ray is sent, making it possible to avoid subjecting vehicles in front or coming from the opposite direction to glare. For left-hand traffic, this cutoff in particular has a horizontal segment located at 0.57 degrees (0.57°) below the horizon.

In the absence of risk of glare, the vehicle passes to a long-range or high beam that illuminates above the horizon and that is devoid of cutoff, thus allowing illumination over a much longer range than with the low beam.

There are nevertheless optical modules that allow, by virtue of a seesawing shield, a low-beam function and a high-beam function to be alternatively produced with the same light source and the same exit dioptric interface. However, such systems require at least one actuator and one specific mechanical device.

One technical problem that the present invention aims to solve is therefore that of producing an optical module allowing two lighting functions, one of which contains a cutoff and the other of which does not, or which have different cutoffs, to be produced, this module having the same luminous signature for these two functions, while simplifying the mechanisms of passage from one function to the other.

To this end, a first subject of the invention is an optical part comprising a block formed from a single first transparent or translucent material, this block comprising:
- a first collimator and a second collimator facing each of which are intended to be positioned a first light source and a second light source, respectively, so that the light beams of these sources, first and second beams, respectively, enter into the block through an entrance dioptric interface of these collimators, the collimators being arranged so that these sources may be positioned in the same plane,
- an intermediate exit dioptric interface toward which the first collimator guides the first beam so that this first beam exits from the block through this intermediate dioptric interface,
- a cutoff dioptric interface that forms a folder with respect to this first beam and that has a cutoff edge, the first collimator and the intermediate dioptric interface being arranged so as to make the first beam converge, outside of the block, on this cutoff edge,
the second collimator and the optical part being arranged so as to make the second beam converge inside the block on the same cutoff edge, the folder also forming a folder with respect to this second beam,
the first and second beams then propagating toward an exit of the optical part.

It is then enough to place a first light source and a second light source facing the first and second collimators, respectively, and a projecting system downstream of the folder and to arrange the latter to project the image of the cutoff edge. This allows two complementary beams to be produced on either side of a cutoff line, said beams being able to be generated alternatively or together, depending on whether one or the other of the light sources or both thereof are turned on. The cutoff line corresponds to the image of this cutoff edge.

With one block of one given material in one given optical part, it is therefore possible to produce two lighting functions, one with a cutoff, in particular a low beam, and one without a cutoff, in particular a high beam. This in particular makes it possible to increase compactness and to obtain the same signature.

In addition, there is no need for an actuator and a mechanism for passing from one beam to the other, since it is the turn-on or turn-off of one of the light sources that makes it possible to pass from one function to the other.

Moreover, the mechanical arrangement of the light sources is simplified. They may in particular be arranged on the same planar carrier, which may be separate or a constituent part.

The optical part therefore allows the arrangement of the optical module in which it will be mounted to be simplified.

The optical part according to the invention may optionally comprise one or more of the following features:
- the folder operates via total internal reflection; the manufacture of the optical part is faster because there is no step of coating the folder with aluminium;
- the block comprises a recess comprising a surface forming the intermediate dioptric interface and a surface forming the folder; this allows the dioptric interfaces to be produced during moulding of the optical part;
- the block comprises:
  a segment forming a primary optic that extends between a first end and a second end,
  a return dioptric interface arranged with said intermediate dioptric interface and the folder between said first end and said second end,
the optical part being arranged so that the folder reflects the first beam onto the return dioptric interface, so that the first beam re-enters into the block through the return dioptric interface, before propagating toward the exit of the optical part;
- the recess comprises a surface forming the return dioptric interface;
- the return dioptric interface may be inclined upstream starting from the cutoff edge; the risk of interference of the return dioptric interface with the second beam is decreased;
- the distance between the return dioptric interface and the intermediate dioptric interface increases with distance from the back of the recess, this back being formed by the folder; this facilitates demoulding of the part;
- the optical part has a projecting segment, forming a projecting system arranged on the one hand downstream of the cutoff edge so as to receive the first and second beams after their passage past this cutoff edge, and on the other hand so as to project to the exit of the projecting segment an image of the cutoff edge; thus, a clearer cutoff line is produced in the first and second beams.

Another subject of the invention is a luminous module comprising an optical part according to the invention.

This module may also comprise a projecting system arranged on the one hand downstream of the cutoff edge so as to receive the first and second beams after their passage past this cutoff edge, and on the other hand so as to project to the exit of the luminous module an image of the cutoff edge.

In this patent application, a luminous module, also called an optical module, is the assembly that, from rays initially coming from at least one light source, forms a functional light beam, namely the beam that illuminates an area outside of the luminous device intended to contain the luminous module or that is seen from outside the luminous device.

The optical part and/or the luminous module according to the invention may optionally comprise one or more of the following features:
- the projecting system is a part or a segment of an integral part made of transparent or translucent material, comprising:
  - a steering dioptric interface downstream and facing the cutoff edge,
  - an end dioptric interface forming the exit of the projecting system, the steering dioptric interface being arranged so as to reflect the first and second beams toward this end dioptric interface,
the steering dioptric interface and the end dioptric interface being arranged so that the first and second beams are refracted by the end dioptric interface so as to project an image of the cutoff edge; the steering dioptric interface and the intermediate dioptric interface are thus positioned from the manufacture, in particular by moulding, of the projecting system;
- at least one segment of the folder lies in a plane making an angle larger than or equal to 90° to a plane in which the steering dioptric interface on the whole lies; this allows a first segment of the optical part to be arranged more vertically, while obtaining an emission of the functional light beam along an approximately horizontal overall axis, thus decreasing the depthwise extent of the optical part and/or of the luminous module;
- the steering dioptric interface functions via total internal reflection;
- on exiting the projecting system, the second beam forms a low beam having an upper cutoff line that is the image of the cutoff edge and the first beam forms an upper portion of a high beam having a lower cutoff line that is the image of the cutoff edge; thus, the upper and lower cutoff lines are complementary and it is possible to form a high beam or a high-beam portion by turning on the first and second light sources.

Another subject of the invention is a luminous vehicle device, in particular a vehicle headlamp, comprising an optical part and/or a luminous module according to the invention.

Another subject of the invention is a vehicle comprising a luminous vehicle device according to the invention, in particular connected to the electrical power supply of the vehicle.

Unless otherwise indicated, the terms "front", "rear", "lower", "upper", "top", "bottom", "transverse", "longitudinal" and "horizontal" refer to the direction of emission of light from the corresponding luminous module. Unless otherwise indicated, the terms "upstream" and "downstream" refer to the direction of propagation of the light.

Other features and advantages of the invention will become apparent on reading the following detailed description of nonlimiting examples, which description will be better understood if reference is made to the appended drawings, in which:

FIGS. 1 to 3 illustrate an example embodiment of an optical part 1 according to the invention.

This optical part 1 comprises a block 2 formed from a single first transparent or translucent material, for example obtained by moulding.

This block 2 comprises a first collimator 11 and a second collimator 12, each having an entrance dioptric interface via which light enters into this block 2.

Figure 1:
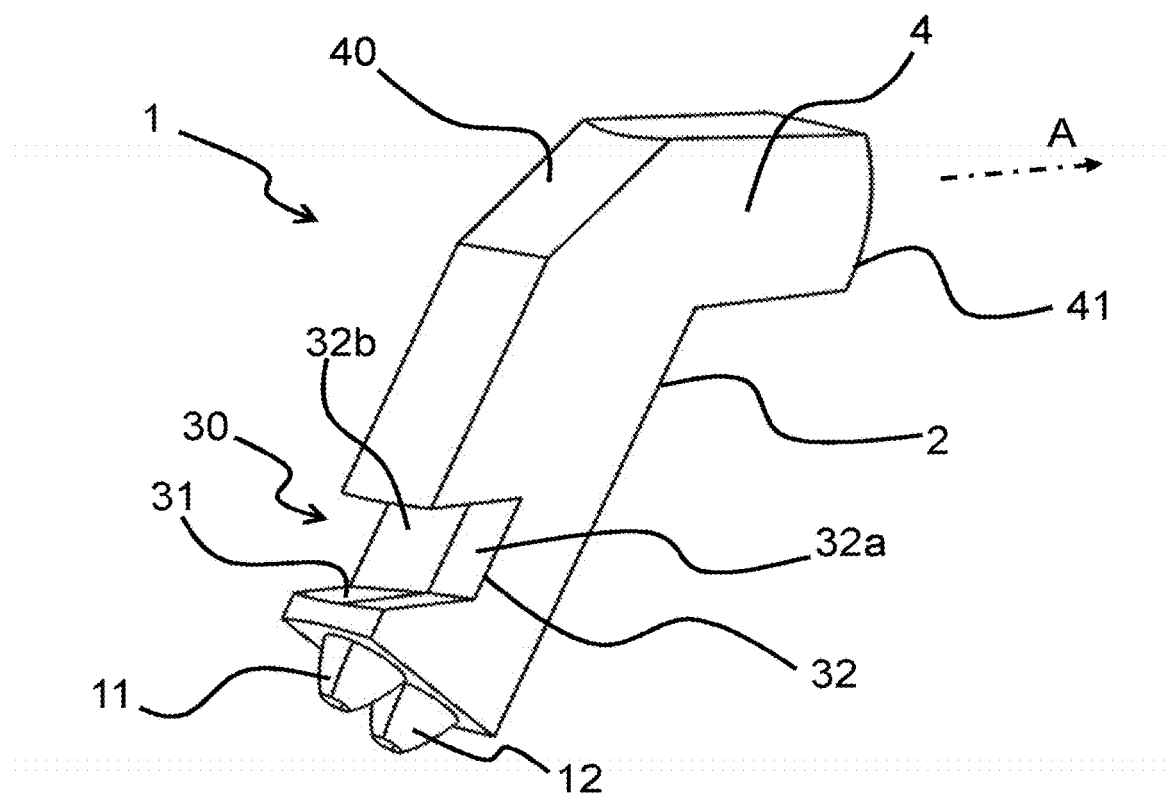
FIG. 1 is a rear perspective view of an optical part according to one example embodiment of the invention.
Figure 2:
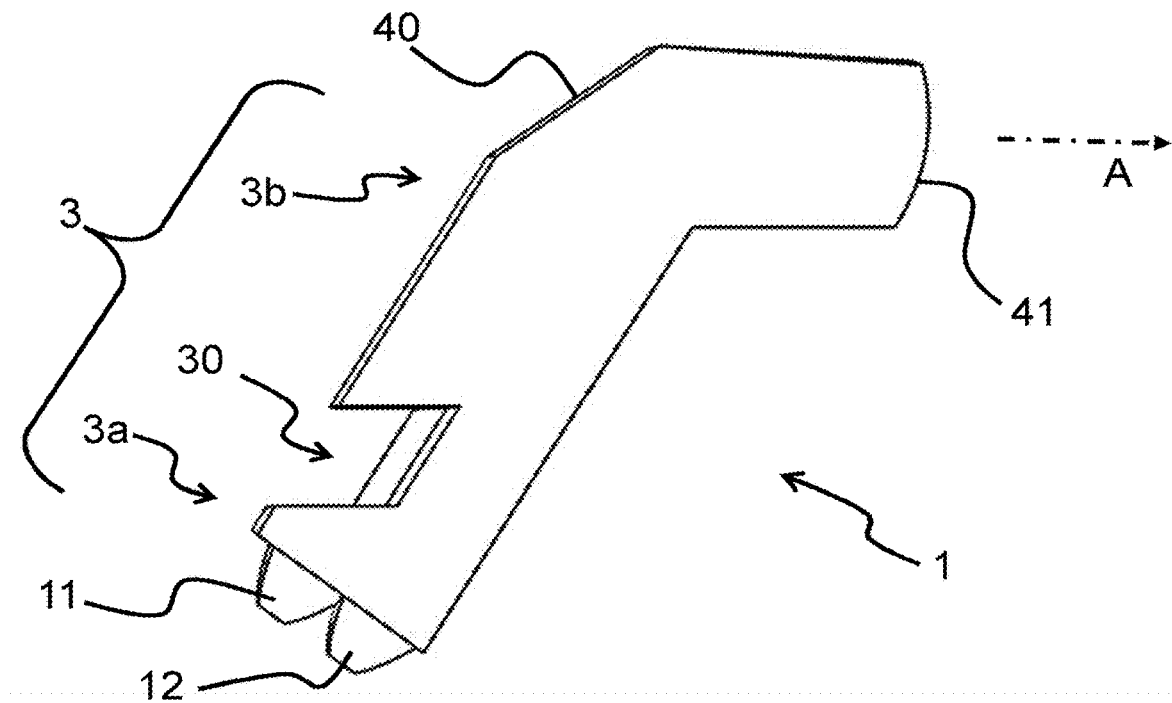
FIG. 2 is a side view of FIG. 1.
Figure 3:
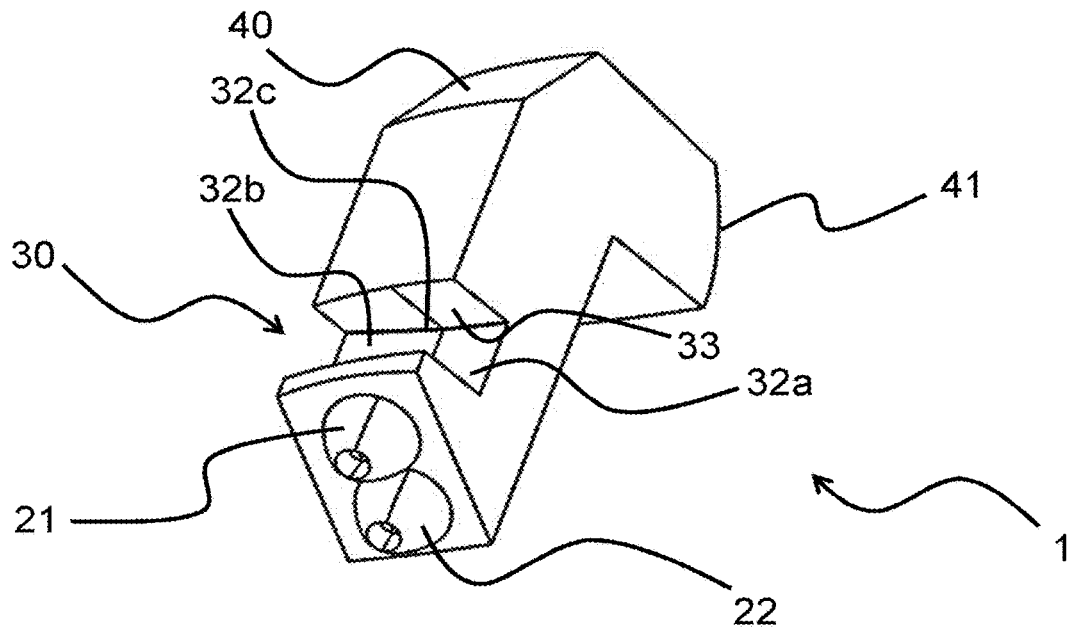
FIG. 3 is a rear perspective view from below of FIG. 1.
Figure 4:
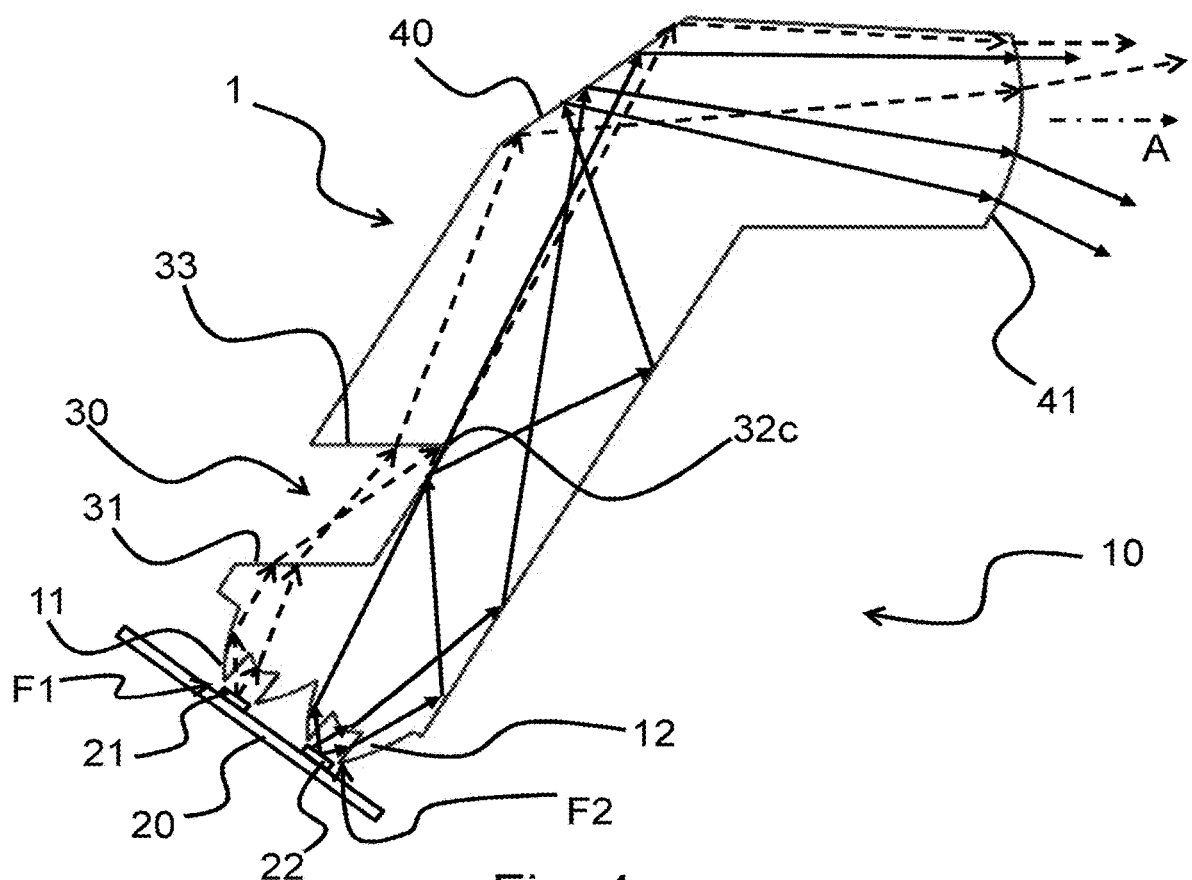
FIG. 4 is a schematic of a longitudinal vertical cross section of FIG. 2, showing the rays of the first and second beams, with, in addition, the light sources on their carrier, this corresponding to one example of a luminous module according to the invention.

As illustrated in FIG. 4, a first light source 21 is placed facing the entrance dioptric interface of the first collimator 11, so that the light beam of this source 21, the first beam F1 below, enters into the block 2 through this entrance dioptric interface. In particular most or even all of its light rays enter into the block 2 via this entrance dioptric interface.

Furthermore, a second light source 22 is placed facing the entrance dioptric interface of the second collimator 12, so that the light beam of this source 22, the second beam F2 below, enters into the block 2 through this entrance dioptric interface. In particular, most or even all of its light rays enter into the block 2 via this entrance dioptric interface.

These first and second collimators 11, 12 are arranged so that the first and second light sources 21, 22 may be positioned in the same plane. Thus, these sources 21, 22 may in particular be arranged on the same planar carrier, such as an upper surface of a radiator or, as here, on a planar printed circuit board 20.

According to the invention, as in the illustrated example, the block 2 may comprise a segment forming a primary optic 3 extending between a first end 3a and a second end 3b. The first and second collimators 11, 12 are arranged at the end of the first end 3a.

Here, the optical part 1 has a projecting segment 4, forming a projecting system that is joined with said second end 3b to form a single part. In other words, the primary optic 3 and the projecting segment 4 here form the block 2.

A recess 30 is placed, here to the rear, between said first end 3a and said second end 3b. This recess 30 is arranged so that the dioptric interfaces 31, 32, 33 bounding this recess 30 form means for producing a lower cutoff line of one beam and an upper cutoff line of another beam, these cutoff lines being complementary.

Here, a first dioptric interface 31, the intermediate exit dioptric interface 31 below, bounds the bottom of the recess 30. It is here horizontal on the whole.

This first dioptric interface 31 is followed by a second dioptric interface, the cutoff dioptric interface or folder 32 below. The latter bounds the recess 30 at the front and therefore forms its back, the recess 30 being open toward the rear.

The second dioptric interface 32 is followed by a third dioptric interface 33, the return dioptric interface 3 below.

The folder 32 joins with the return dioptric interface 33 at a cutoff edge 32c.

Here, the folder 32 comprises two facets 32a, 32b that are substantially planar and that make therebetween an angle corresponding to the angle between an oblique segment and a horizontal segment of a cutoff line of a low beam, namely about 15°.

The projecting segment 4 comprises:
a steering dioptric interface 40 above and facing the cutoff edge 32c;
an end dioptric interface 41 forming the exit of the projecting segment 4.

According to the invention, as here, the steering dioptric interface 40 and the end dioptric interface 41 may form a convergent system with a focal plane, so that the cutoff edge 32c is arranged in this focal plane.

Here, the facets 32a, 32b of the folder 32 lie in a plane making an angle larger than or equal to 90° to a plane in which the steering dioptric interface 40 on the whole lies.

FIG. 4 schematically illustrates the path of the first light beam F1, the rays of which are represented by dashed arrows the heads of which are formed by two line segments. The path of the second light beam F2, the rays of which are represented by solid arrows the heads of which are solid triangles, is also shown. These paths are illustrated from their emission from the light sources 21, 22, to their emission out of the optical part 1 through the exit 41.

The arrangement of the optical part 1 here allows the paths of the rays described below to be achieved.

The first collimator 11 deviates the first beam F1 toward the intermediate dioptric interface 31, so that this first beam exits, by refraction, from the block 2 through this intermediate dioptric interface 31, and thus enters into the recess 30.

By virtue of the arrangement of the first collimator 11 and of the intermediate dioptric interface 31, the first beam F1 converges, outside of the block 2, in the recess 30, toward and on the cutoff edge 32c.

Generally according to the invention, as here, the projecting system 4 may be focused on the cutoff edge 32c.

Thus, the rays of the first beam F1 that pass through the cutoff edge 32c then reach the steering dioptric interface 40, which then reflects these rays toward the end dioptric interface 41, where the rays exit by refraction parallel to the optical axis A.

In contrast, the rays of the first beam F1 that pass to the rear of the cutoff edge 32c re-enter by refraction into the block 2 through the return dioptric interface 33 and reach the steering dioptric interface 40, which then reflects these rays toward the end dioptric interface 41, where these rays exit by refraction with a greater upward inclination with respect to the optical axis A.

Likewise, the rays of the first beam F1 that encounter the folder 32 are reflected toward the return dioptric interface 33 and therefore re-enter by refraction into the block 2 on the rear side of the cutoff edge 32c. The first beam F1 is therefore indeed reflected, here partially, toward the return dioptric interface 33 by the folder 32. As for the rays mentioned in the preceding paragraph, the rays reflected by the folder 32 reach the steering dioptric interface 40, which then reflects these rays toward the end dioptric interface 41, where these rays exit by refraction with a greater upward inclination with respect to the optical axis A.

Thus, the first beam F1 forms a lighting beam having a lower cutoff line C1 that is the image of the cutoff edge 32c. This lighting beam is schematically shown in FIG. 5, in projection on a vertical screen substantially perpendicular to the optical axis A, and for example located at 25 metres.

Figure 5:
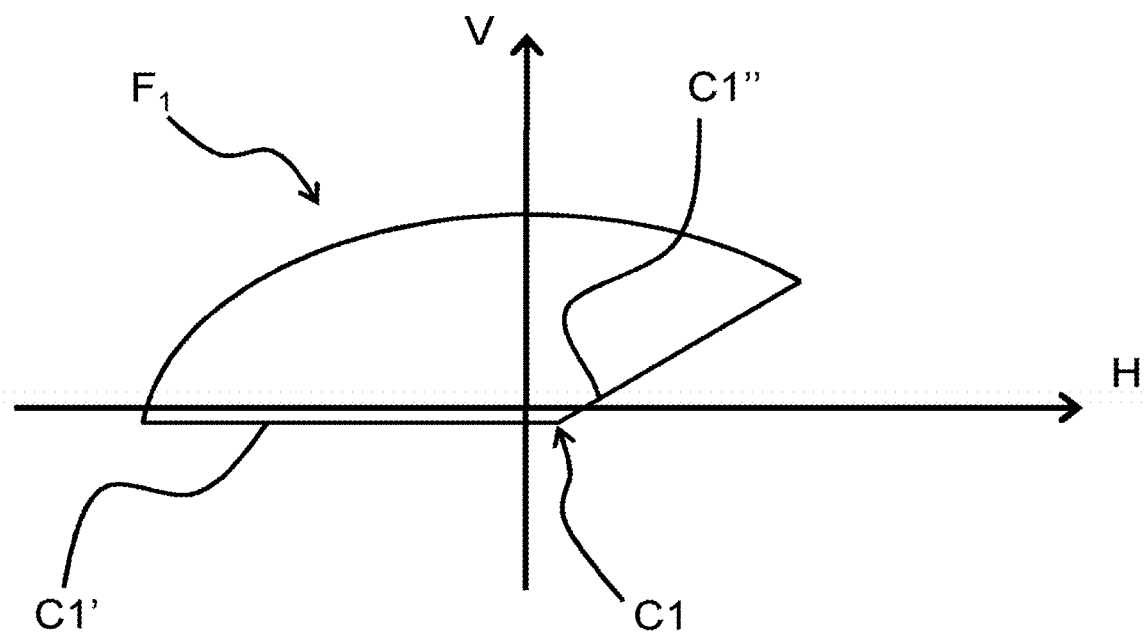
FIGS. 5 to 7 show, in a coordinate system H, V, where H symbolises the horizon and V the vertical axis passing through the optical axis A of the luminous module of FIG. 4, the light beams obtained by turning on the first, second or both the light sources, respectively.

As may be seen in FIG. 5, the cutoff line C1 has a horizontal segment C'1 and an oblique segment C"1 corresponding to the shape of the cutoff edge 32c.

Specifically, the angle between these two segments C'1 and C"1 corresponds to the angle made between the two facets 32a, 32b of the folder 32, and therefore to the angle that the cutoff edge 32c has.

Rays that were liable to pass in front of the cutoff edge 32c have therefore been steered rearward by the second dioptric interface 32 of the recess 31 and therefore join the beam F1. The second dioptric interface 32 therefore indeed forms a folder for the first beam F1, from outside the block.

The second collimator 12 deviates the second beam F2 so as to make it converge inside the block 2 toward and on the cutoff edge 32c.

Since the projecting system 4 is focused on the cutoff edge 32c, the rays of the second beam F2 that pass through the cutoff edge 32c then reach the steering dioptric interface 40, which then reflects these rays toward the end dioptric interface 41, where the rays exit by refraction parallel to the optical axis A.

In contrast, the rays of the second beam F2 that pass in front of the cutoff edge 32c re-enter by refraction into the block 2 and reach the steering dioptric interface 40, which then reflects these rays toward the end dioptric interface 41, where these rays exit by refraction with a greater downward inclination with respect to the optical axis A.

Likewise, the rays of the second beam F2 that encounter the folder 32 are directly or indirectly reflected toward the steering dioptric interface 40 and pass in front of the cutoff edge 32c. As for the rays mentioned in the preceding paragraph, the steering dioptric interface 40 then reflects these rays toward the end dioptric interface 41, where they exit by refraction with a greater downward inclination with respect to the optical axis A.

Thus, the second beam F2 forms a lighting beam having an upper cutoff line C2 that is the image of the cutoff line 32c. This lighting beam is schematically shown in FIG. 6, under the same projection conditions as for FIG. 5.

Figure 6:
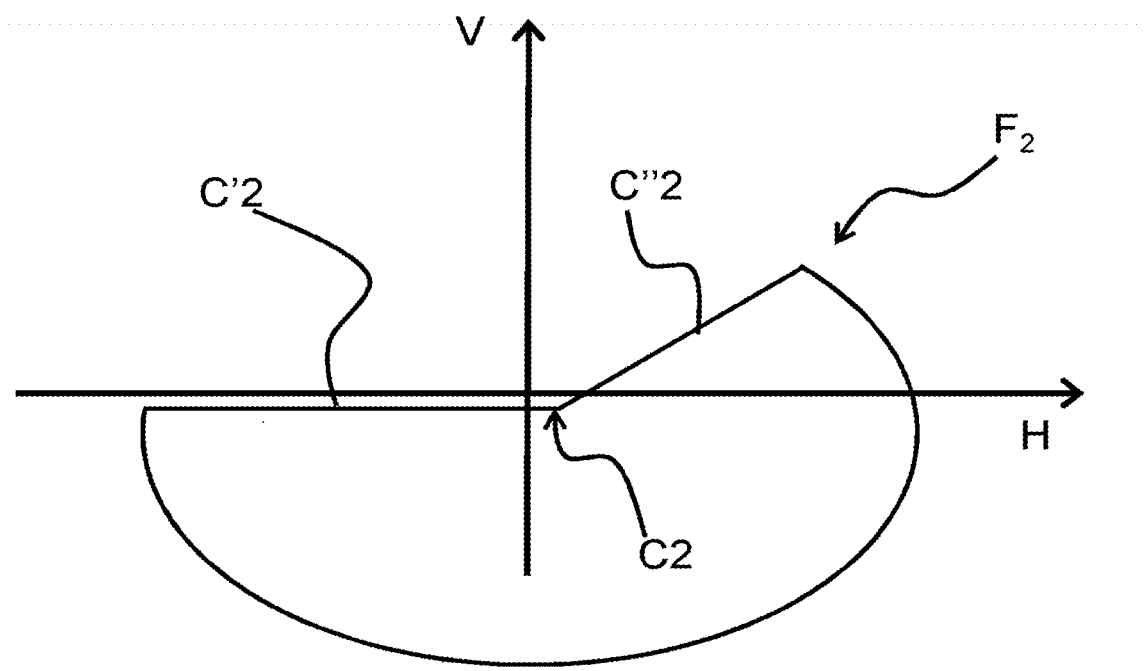

As may be seen in FIG. 6, the cutoff line C2 has a horizontal segment C'2 and an oblique segment C"2, corresponding to the shape of the cutoff edge 32c. Specifically, the angle between these two segments C'2 and C"2 corresponds to the angle made between the two facets 32a, 32b of the folder 32, and therefore to the angle that the cutoff edge 32c has.

Rays that were liable to pass to the rear of the cutoff edge 32c have therefore been steered frontward by the second dioptric interface 32 of the recess 31 and therefore join the second beam F2. The second dioptric interface 32 therefore indeed forms a folder for the second beam F2, from inside the block 2.

Thus, two complementary beams F1 and F2 are created on either side of a cutoff line, these beams being able to be generated alternatively or together, depending on whether one or the other of the light sources 21, 22 or both thereof are turned on.

Figure 7:
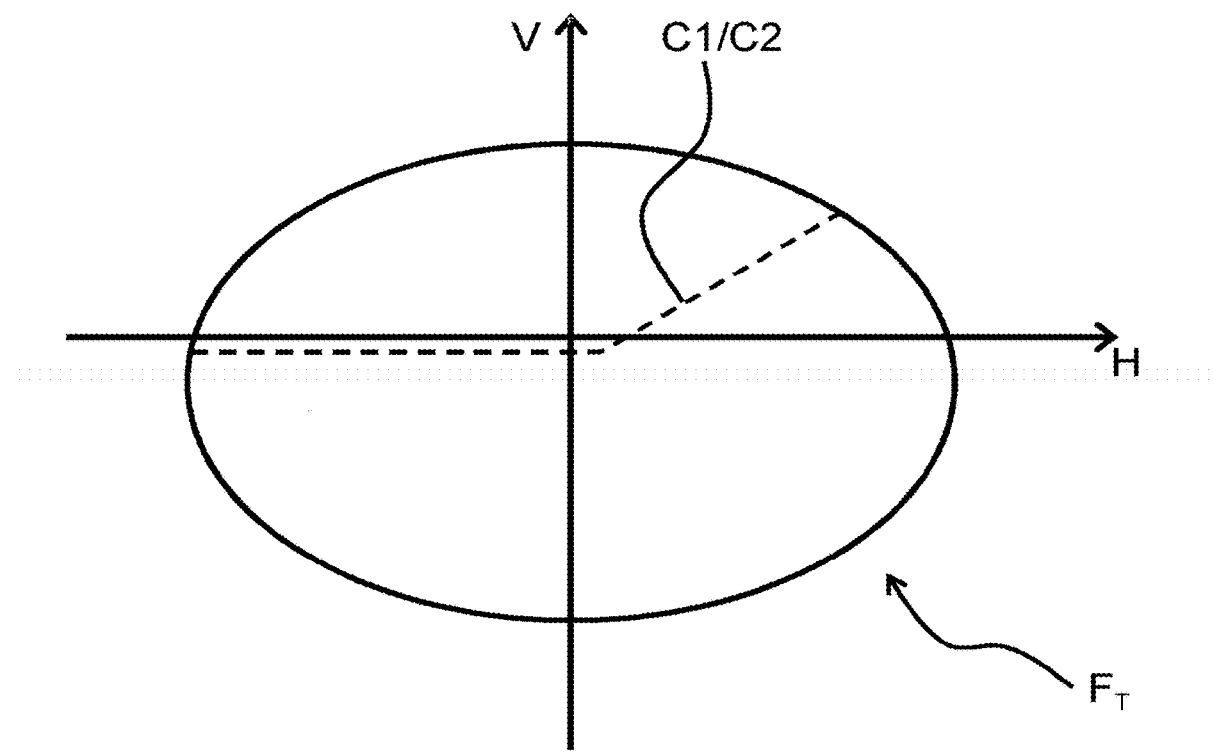

Thus, in FIG. 7 the total beam $F_T$ obtained by generating at the same time the first beam F1 and the second beam F2 may be seen. The cutoff lines C1, C2 adjoin and are here shown by a dashed line.

For example, the second beam F2 may form a low beam, as illustrated here, or a central segment with the oblique cutoff line of a low beam. This segment is then superposed so as to complement a bottom low-beam segment. The total beam $F_T$ may itself form a high beam, as in FIG. 7, or, in the second case, the central segment of the high beam.

The folder 32 and the steering dioptric interface 40 here function via total internal reflection.

It will be noted that here the recess 30 is "empty", in the sense that it is filled with the ambient gas, i.e. the air, contained in the luminous device equipped with the luminous module 10. Alternatively, the recess 30 may be filled with a second transparent or translucent material with a refractive index different from that of the block 2.

Alternatively, the folder 32 and the steering dioptric interface 40 may be covered, on the outside of the block 2, with a reflective coating such as an aluminium coating.

Here, the primary optic 1 and projecting segment 4 shown are integrally formed.

However, according to one variant (not shown) they could be two separate parts. The optical part according to the invention would in this case be formed by the primary optic.

According to the preceding paragraph, the optical part need not comprise any return dioptric interface, the part forming the projecting system being able to be arranged so as to directly collect the rays exiting from the intermediate dioptric interface or reflected by the folder on the outside of the block, and those exiting from the block after guidance through the block by reflection from the folder and/or the walls of the primary optic or even coming directly from the second collimator.

According to one variant (not shown) the recess may be used so that the rays passing therethrough produce a or a segment of a low beam, whereas the or the segment of high beam is produced by the rays remaining in the block. For example, with respect to the illustrated example, the recess would be arranged to the front of the primary optic 3 and would open toward the front.

Generally according to the invention, as illustrated, the light sources 21, 22 may be light-emitting diodes (LEDs).

Figure 8:
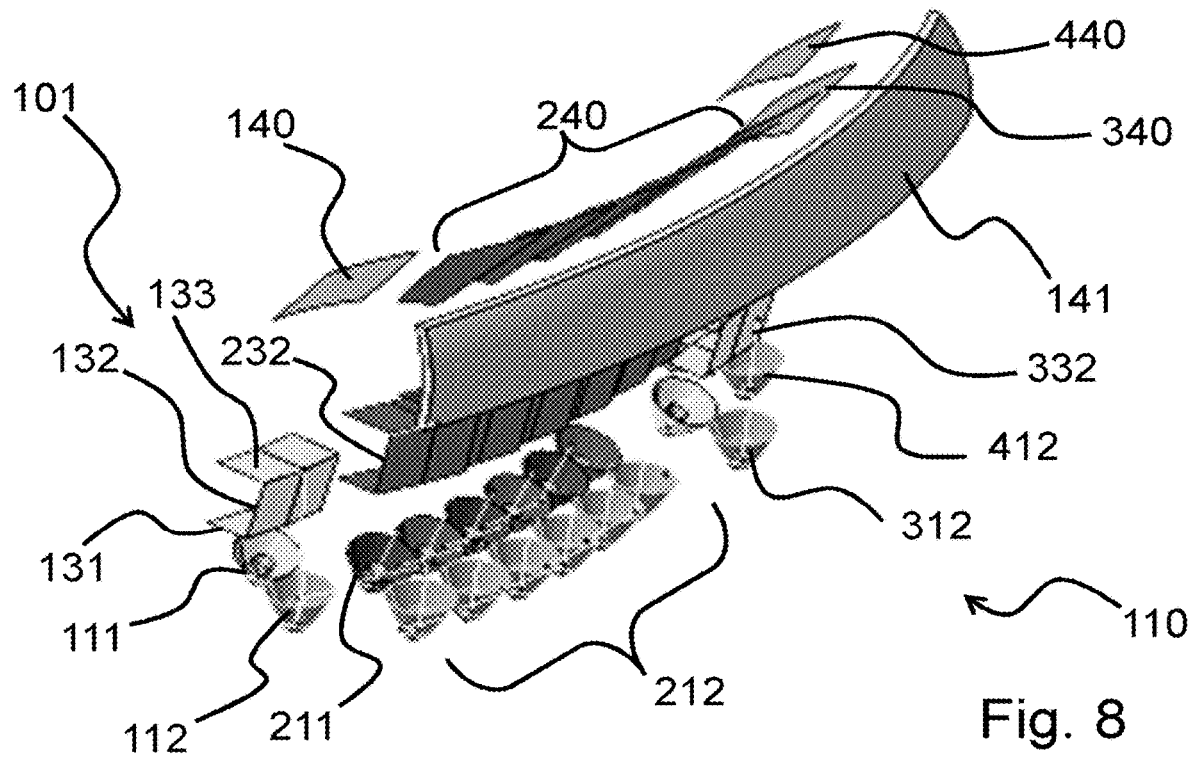
FIG. 8 shows a luminous module with an optical part according to a second example embodiment.

FIG. 8 illustrates a second embodiment, in which a module 110 with a unitary optical part is produced.

This optical part comprises a first elementary segment 101, which is equivalent in arrangement to the optical part 1 described above, except that it does not form by itself an optical part. In particular, its collimators 111, 112, its recess, with its three dioptric interfaces 131, 132, 133, and its steering dioptric interface 140 are arranged in the same way and will not be described further.

Here, the unitary optical part also comprises six second elementary segments, the collimators, the folders and the steering dioptric interfaces of which are referenced 212, 232 and 240, respectively. These second elementary segments differ from the first 101 in that their folders 232 are completely planar. Specifically, they make it possible to participate in the formation of the horizontal cutoff of the low beam over all its width, when the corresponding second beams are emitted, and to cover the width of the high beam, when the corresponding first beams are emitted.

The first elementary segment 101 is located on one side of the second elementary segments, which for their part are adjacent to one another. On the other side, third and fourth elementary segments are arranged, which third and fourth segments are similar to the first segment 101.

In FIG. 8, on account of the perspective, it is possible to see the second collimators 312, 412 and the steering dioptric interfaces 340, 440 of these third and fourth elementary segments. In contrast, only the first collimator and the folder 332 of the third segment may be seen, those of the fourth segment being hidden.

These third and fourth elementary segments also allow central segments with oblique cutoff to be produced in order to complement intensity-wise the beam formed by the first segment 101.

An exit dioptric interface 141, here with a smooth surface, is arranged facing all the steering dioptric interfaces 140, 240, 340, 440 and forms with the latter the projecting system of each of the elementary segments.

It will be noted that in FIG. 8, for the sake of clarity, only the collimators 111, 112, 212, 312, 412, the recesses, the steering dioptric interfaces 140, 240, 340, 440 and the exit dioptric interface 141 have been shown. The surfaces joining them together have not been shown. However, it is here a question of an integrally formed unitary part.

The elementary segments may be joined laterally to one another, the various collimators and dioptric interfaces allowing most, or even all of the rays to remain in the elementary segment into which they initially entered.

As a variant, the elementary segments may form distinct light guides that join into a single integrally formed part only at the projecting system or between the steering dioptric interfaces and the exit dioptric interface 141.

It is nevertheless possible to produce each elementary segment individually and subsequently to fasten them and to adjust them relative to one another in the luminous device.

The invention claimed is:

1. Optical part comprising a block formed from a single first transparent or translucent material, this block comprising:
    a first collimator and a second collimator facing each of which are intended to be positioned a first light source and a second light source, respectively, so that light beams of these sources, first and second beams, respectively, enter into the block through an entrance dioptric interface of these collimators, the collimators being arranged so that these sources may be positioned in the same plane,
    an intermediate exit dioptric interface toward which the first collimator guides the first beam so that this first beam exits from the block through this intermediate dioptric interface,
    a cutoff dioptric interface that forms a folder with respect to this first beam and that has a cutoff edge, the first collimator and the intermediate dioptric interface being arranged so as to make the first beam converge, outside of the block, on this cutoff edge,
    the second collimator and the optical part being arranged so as to make the second beam converge inside the block on the same cutoff edge, the folder also forming a folder with respect to this second beam,
    the first and second beams then propagating toward an exit of the optical part.

2. Optical part according to claim 1, wherein the folder operates via total internal reflection.

3. Optical part according to claim 2, wherein the block comprises a recess comprising a surface forming the intermediate dioptric interface and a surface forming the folder.

4. Optical part according to claim 2, wherein the block comprises:
    a segment forming a primary optic that extends between a first end and a second end,
    a return dioptric interface arranged with the intermediate dioptric interface and the folder between the first end and the second end,
    the optical part being arranged so that the folder reflects the first beam onto the return dioptric interface, so that the first beam re-enters into the block through the return dioptric interface, before propagating toward the exit of the optical part.

5. Luminous module comprising:
an optical part according to claim 2,
a projecting system arranged on the one hand downstream of the cutoff edge so as to receive the first and second beams after their passage past this cutoff edge, and on the other hand so as to project to the exit of the luminous module an image of the cutoff edge.

6. Luminous vehicle device comprising an optical part according to claim 2.

7. Optical part according to claim 1, wherein the block comprises a recess comprising a surface forming the intermediate dioptric interface and a surface forming the folder.

8. Optical part according to claim 1, wherein the block comprises:
a segment forming a primary optic that extends between a first end and a second end,
a return dioptric interface arranged with the intermediate dioptric interface and the folder between said first end and said second end,
the optical part being arranged so that the folder reflects the first beam onto the return dioptric interface, so that the first beam re-enters into the block through the return dioptric interface, before propagating toward the exit of the optical part.

9. Optical part according to claim 8, wherein the recess comprises a surface forming the return dioptric interface.

10. Optical part according to claim 7, wherein the recess comprises a surface forming a return dioptric interface.

11. Optical part according to claim 10, wherein the optical part has a projecting segment, forming a projecting system arranged on the one hand downstream of the cutoff edge so as to receive the first and second beams after their passage past this cutoff edge, and on the other hand so as to project to the exit of the projecting segment an image of the cutoff edge.

12. Optical part according to claim 8, wherein the optical part has a projecting segment, forming a projecting system arranged on the one hand downstream of the cutoff edge so as to receive the first and second beams after their passage past this cutoff edge, and on the other hand so as to project to the exit of the projecting segment an image of the cutoff edge.

13. Optical part according to claim 6, wherein the projecting system is a part or a segment of an integral part made of transparent or translucent material, comprising:
a steering dioptric interface downstream and facing the cutoff edge,
an end dioptric interface forming the exit of the projecting system, the steering dioptric interface being arranged so as to reflect the first and second beams toward this end dioptric interface,
the steering dioptric interface and the end dioptric interface being arranged so that the first and second beams are refracted by the end dioptric interface so as to project an image of the cutoff edge.

14. Optical part according to claim 13, wherein at least one segment of the folder lies in a plane making an angle larger than or equal to 90° to a plane in which the steering dioptric interface on the whole lies.

15. Optical part according to claim 14, wherein, on exiting the projecting system, the second beam forms a low beam having an upper cutoff line that is the image of the cutoff edge and the first beam forms an upper portion of a high beam having a lower cutoff line that is the image of the cutoff edge.

16. Optical part according to claim 13, wherein the steering dioptric interface functions via total internal reflection.

17. Optical part according to claim 13, wherein, on exiting the projecting system, the second beam forms a low beam having an upper cutoff line that is the image of the cutoff edge and the first beam forms an upper portion of a high beam having a lower cutoff line that is the image of the cutoff edge.

18. Luminous module comprising:
an optical part according to claim 1,
a projecting system arranged on the one hand downstream of the cutoff edge so as to receive the first and second beams after their passage past this cutoff edge, and on the other hand so as to project to the exit of the luminous module an image of the cutoff edge.

19. Optical part according to claim 18, wherein the projecting system is a part or a segment of an integral part made of transparent or translucent material, comprising:
a steering dioptric interface downstream and facing the cutoff edge,
an end dioptric interface forming the exit of the projecting system, the steering dioptric interface being arranged so as to reflect the first and second beams toward this end dioptric interface,
the steering dioptric interface and the end dioptric interface being arranged so that the first and second beams are refracted by the end dioptric interface so as to project an image of the cutoff edge.

20. Luminous vehicle device comprising an optical part according to claim 1.

* * * * *